(12) United States Patent
Mayer et al.

(10) Patent No.: US 6,551,184 B1
(45) Date of Patent: Apr. 22, 2003

(54) METHOD AND DEVICE FOR AIR CONDITIONING IN VEHICLES

(75) Inventors: Erhard Mayer, Holzkirchen (DE); Rudolf Schwab, Lenggries (DE)

(73) Assignee: Fraunhofer. Gesellschaft zur Forderung der Angewandten Forschung e.V. (DE)

( * ) Notice: Subject to any disclaimer, the term of this patent is extended or adjusted under 35 U.S.C. 154(b) by 0 days.

(21) Appl. No.: 09/669,639

(22) Filed: Sep. 26, 2000

Related U.S. Application Data

(63) Continuation of application No. PCT/EP99/02091, filed on Mar. 26, 1999.

(30) Foreign Application Priority Data

Mar. 26, 1998 (DE) .......................... 198 13 524
Jan. 26, 1999 (DE) .......................... 199 11 606

(51) Int. Cl.$^7$ ................................................ B64D 13/00
(52) U.S. Cl. ........................................... 454/76; 454/120
(58) Field of Search ........................... 454/76, 120, 136, 454/907

(56) References Cited

U.S. PATENT DOCUMENTS

| | | | | |
|---|---|---|---|---|
| 2,430,335 A | * | 11/1947 | Hart ........................... | 454/120 |
| 4,981,324 A | * | 1/1991 | Law ........................... | 297/180 |
| 5,567,230 A | * | 10/1996 | Sinclair ........................ | 95/273 |
| 5,695,396 A | * | 12/1997 | Markwart et al. ............. | 454/76 |
| 5,791,982 A | * | 8/1998 | Curry et al. ................... | 454/74 |
| 5,890,957 A | * | 4/1999 | Scherer ......................... | 454/76 |
| 6,048,024 A | * | 4/2000 | Wallman ................ | 297/180.14 |
| 6,277,023 B1 | * | 8/2001 | Schwarz ...................... | 454/120 |

FOREIGN PATENT DOCUMENTS

DE         WO 99/48756         9/2000

* cited by examiner

*Primary Examiner*—Derek S. Boles
(74) *Attorney, Agent, or Firm*—St. Onge Steward Johnston & Reens LLC

(57) ABSTRACT

What is described here is a method of air conditioning in vehicles and in aircraft in particular, wherein the air flow supplied to the passenger cabin consists of outside air possibly heated to a moderate temperature and a fraction of circulated air.

The inventive method is characterised by the provision that the fraction of circulated air in the supplied air flow is limited by means of at least one $CO_2$ sensor in such a way that the $CO_2$ fraction in the air in the passenger cabin does not exceed a defined threshold. Alternatively or additionally it is possible, below the threshold of circulated air as pre-determined by the $CO_2$ sensor, to control the circulated-air fraction in the supplied air flow in such a way that the relative humidity is maintained within a humidity range which is higher than the relative humidity after heating to room temperature, and that the supplied air flow is introduced into the passenger cabin via at least one filter.

34 Claims, 2 Drawing Sheets

METHOD AND DEVICE FOR AIR CONDITIONING IN VEHICLES

This is a continuation of pending International Application PCT/EP99/02091 filed on Mar. 26, 1999, which designates the United States.

DESCRIPTION

1. Field of the Invention

The present invention relates to a method of air conditioning in vehicles and in aircraft in particular in accordance with the introductory clauses of Patent Claims 1, 2 or 5, or to a device in accordance with the introductory clause of Patent Claim 18.

2. Prior Art

It is common in motor vehicles to mix circulated air, i. e. air from the interior of the vehicle, and supplied or outside air to produce the air flow serving to condition the air inside the vehicle. Depending on the temperature, the supplied or outside air must be heated or cooled or can be used directly to cool the passenger compartment.

In commercially available air conditioning installations for motorcars the circulated air is admixed to the outside air almost exclusively in consideration of exhaust gas aspects: when the motorcar stops at a traffic light or in a traffic jam the system is automatically or manually switched over from outside air supply to circulated-air mode.

From the German Patent DE 195 40 566 A1 it is known to admix dry circulated air to humid outside air in order to avoid that the windows of the motorcar will be clouded by the moisture carried in the outside air.

In busses, trains or aircraft the admixture of circulated air to the outside air is not employed to the same extent as this is the case in motorcars; the reason might reside in the fact that bacteria, germs, odours, sweat etc. should not be distributed by the circulated air via the air conditioning system all over the passenger cabin. Exemplary reference is made to the German Patent DE 39 26 638 A1 which reflects prior art in air conditioning systems for busses.

Moreover, for an explanation of all the particulars which are not described here in further details explanation is made to both the above-quoted prior art documents and the prior art publications which will also be identified in the following.

In aircraft the following additional problem arises: the supplied air is not only very cold but also very dry.

When circulated air is admixed to the outside air—as in prior art—exclusively in consideration of energy aspects—which occurs, as a rule, for cooling the passenger cabin in aircraft, which is "heated" by the passengers—events occur which include the following problems:

In the case of strong solar radiation prior art simply provides for passenger cabin cooling in a way that large quantities of very cold outside air are admixed to the air flow supplied to the passenger cabin; the consequence is a very dry cabin air, which the passengers normally perceive as uncomfortable even though they frequently accept it. The dry air may even cause trouble in the respiratory system of sensitive persons.

In the case of weak solar radiation, by contrast, the fraction of circulated air in the air flow supplied to the passenger cabin is very high in order to save heating energy. As has been found by the inventors, the $CO_2$ level in the cabin air is hence very high in conventional aircraft air conditioning installations, frequently ranging above an agreeable or tolerable limit which is characterised by the so-called Pettenkofer threshold.

Furthermore, for reasons which are only speculative despite the foregoing statements, some airline companies dispense with the admixture of circulated air for air conditioning inside an aircraft.

As, however, the outside air and hence the supplied air is very cold, as has been outlined above, the admixture of warm circulated air and cold supplied air would present the advantage that, compared against the use of supplied air alone, the quantity of energy is reduced which is required for achieving a moderate temperature of the air flow supplied to the passenger cabin.

BRIEF DESCRIPTION OF THE INVENTION

The present invention is based on the problem of providing a method of as well as a device for air conditioning in vehicles and in aircraft in particular, which will permit the achievement of a moderate temperature in the passenger cabin, which is agreeable particularly from the viewpoints of comfortableness and tolerability, at the lowest energy consumption possible.

Inventive solutions to this problem are defined in the parallel Patent Claims 1, 2 or 5, respectively; the features defined in these claims are also suitable for cumulative application. Improvements of the invention are the subject matters of the dependent claims.

Devices for realising the inventive methods are the subject matters of the Claims 16 et seq.

The different inventive solutions characterised in the claims are based on the common inventive idea that the admixture of the outside air and the circulated air should be made in consideration of viewpoints of comfortableness or tolerability, respectively, rather than in consideration of energy or exhaust gas aspects.

In the solution defined in Claim 1 the fraction of the circulated air in the supplied air flow is limited by means of at least one $CO_2$ sensor such that the $CO_2$ fraction in the air in the passenger cabin will not exceed a defined threshold. The $CO_2$ fraction threshold amounts to 0.15% by volume and preferably to 0.10% by volume, for instance; this value corresponds to the so-called Pettenkofer threshold above which signs of fatigue and/or irritations of the eyes or the respiratory tract may occur.

The control or regulation of the circulated-air fraction in a way that a defined carbon dioxide level will not be exceeded constitutes hence a "master" controller for all further or subordinate systems controlling the fraction of the circulated air, which are preferably "slave" control systems in dependence on the "master" controller.

In this respect it is particularly preferable (even though not definitely necessary) that the inventive device be so designed that it supplies an outside air quantity of 0.5 $m^3$/min per passenger at minimum into the passenger cabin. It is moreover preferred that the air supply system should be so designed that it ensures 20 air exchange cycles at minimum per hour.

The inventive method and the inventive device are suitable for application in vehicles of any kind such as motorcars, lorries, busses or ships. The method or the device, respectively, according to the present invention are particularly preferred, however, in aircraft where on account of the very cold outside air, which is present at altitudes at which passenger air planes normally cruise, the problem occurs that the supplied outside air is very dry after it had been heated to room temperature. Moreover, air planes are equipped with a pressurised cabin so that due to the largely closed system—with a leakage rate typically amounting to 10% in aircraft equipped with a pressurised cabin—farther-going problems arise in addition to those occurring in other vehicles, specifically in consideration of tolerability aspects.

In aircraft—and, of course, also in other vehicles—it is therefore preferred that below the threshold predetermined for the circulated air quantity by the $CO_2$ sensor the fraction of the circulated air in the supplied air flow be controlled in such a way that the relative humidity will be maintained within an "agreeable" humidity range which is higher than the relative humidity in the supplied outside air after heating to room temperature. In distinction from prior art in motor vehicles, where the fraction of circulated air in the circulated air quantity is adjusted exclusively in consideration of energy balance or exhaust gas aspects while in any other respect the humidity is rather considered to be disturbing, the fraction of circulated air in the air volume circulated in the vehicle in accordance with the inventive method is so controlled or adjusted, respectively, that the relative humidity is approximately maintained within a predetermined (agreeable) range.

Compared against conventional methods, the inventive method entails the particular advantage that there is no necessity to humidify the supplied air or that it a substantial reduction of the water quantity is possible, which must be added to the supplied air for humidification.

It is hence possible without any problems, in particular, to bring the relative humidity to a level of at least 20%, preferably to a value of more than 30%, at cabin temperature and particularly at 23° C. With these values an agreeable room climate is achieved.

In order to avoid that as a consequence of the comparatively high percentage of circulated air bacteria, germs, odours, sweat etc. will be distributed within the passenger cabin the supplied air flow is introduced via at least one filter into the passenger cabin. The air supply may take place via the vehicle cover and/or the rear side of the front seats in a manner known per se. With this concept it is possible in particular to provide the air outlets in the rear side of the backrest of the respective front seat, inclusive of possibly disposed foldable tables, etc.

The filter or filters may be large-area filters with a low flow resistance in particular which purify the air preferably in view of bacteria, odours and aerosols. The term "aerosol" is to be understood in this context to encompass particles, organic substances, dusts, endotoxins, droplets, etc.

The large-area filter or filters with a low flow resistance, which is or are provided, for instance, in the cabin top wall or in the respective front seat, may be micro filters or composite filters, in particular. In an improvement of the invention the filter or filters is/are a micro filter coated with activated carbon or with a cartridge filled with activated carbon and/or a micro filter with an additional zeolith filter. Moreover, the filter or filters may be electrically biased and/or non-woven fibre materials.

On account of the large-area filter or filters, the circulated air can yet be supplied at a low air flow rate, with controlling means being possibly associated with each vehicle seat, which may comprise a room climate measuring unit if necessary. Room climate measuring units are described, for instance, in the German Patent DE 32 05 704 A1 or in the article "Development of a measuring unit for determining the physical room climate conditions" as published in the journal "Gesundheits-Ingenieur" [*The Health Engineer*], 1985, pages 175 to 192". Moreover, explicit reference is made to these prior art documents for an explanation of all particulars which are not described here in more details.

Due to the use of room climate measuring units it is possible to control the surface temperature of the air discharge surface and the motion of the air in physiologic terms and particularly in consideration of the thermal comfortableness. Hence every occupant or passenger can adjust the air flow to which he or she is exposed in correspondence with his or her personal requirements.

It is possible in particular to provide the filter or filters in the discharge opening of the air flow in the passenger cabin; according to an alternative or additionally at least one part of the air flow may be discharged through discharge nozzles.

The inventive device suitable for carrying through the method comprises at least one $CO_2$ sensor and/or a humidity sensor in the exhaust air. The output signals of the sensor or sensors, respectively, are applied to a controller, which controls the percentage of circulated air in the circulated air quantity. The controller can hence adjust the percentage in such a way that the desired relative humidity will be reached or that the $CO_2$ threshold will not be exceeded.

It is, of course, possible to provide a further humidity sensor, which detects the humidity in the supplied air flow (which is dry, as a rule, in aircraft) so that variations of the relative humidity as a consequence of humidity variations in the supplied air will be avoided.

The recovery of the water carried in the air in the passenger cabin can be alternatively or additionally realised by the provision that the humidity contained in the discharged air—i.e. the cabin air discharged, for instance, in an air plane for pressure equalisation to the outside due to the supplied outside air—is condensed and returned into the air flow supplied into the passenger cabin.

With the inventive provisions it is normally no longer necessary to carry water on board for humidification of the air in the passenger cabin.

BRIEF DESCRIPTION OF THE DRAWING

The present invention will be described in more details in the following by exemplary embodiments with reference to the drawing in which.

DESCRIPTION OF EMBODIMENTS

In the embodiments described below methods and devices for air conditioning in aircraft will be described, without any limitation of the general applicability of the invention, even though they reflect preferred provisions.

In accordance with the present invention, the following data is taken as a basis, which is typical of the aircraft types presently in the market or under development:

The passengers typically discharge 40 grams of vapour—in the form of sweat or respiratory air—per passenger and per hour.

The quantity of fresh air supplied per passenger and per minute, i.e. the quantity of outside air, should amount to 0.5 $m^3$ at minimum.

The air present in the cabin should be exchanged at least 20 times per hour.

The temperature in the cabin should be within the range between 22 and 24° C.; to achieve this temperature level it is necessary that the temperature of the air supplied via the air conditioning system corresponds to roughly 18° C. because normally the passengers in the cabin radiate more heat than the aircraft discharges to the outside via the outer sheathing.

Figure 1:
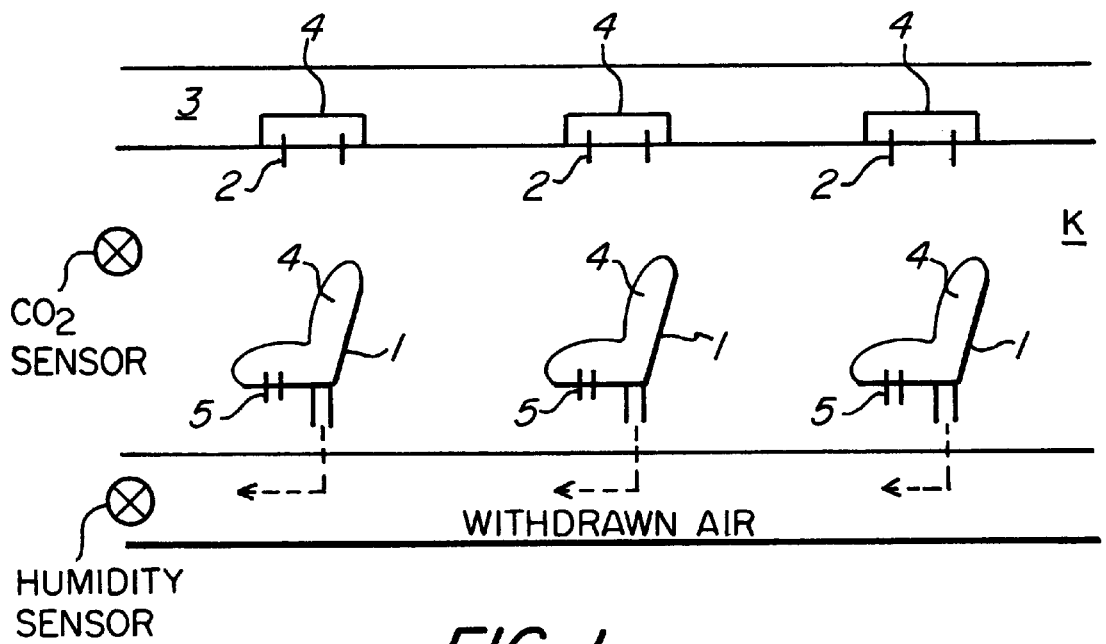
FIG. 1 is a schematic view of a passenger cabin including an inventive air circulation system.

Based on this data, FIG. 1 shows a first embodiment of the invention. As has been set out above already, FIG. 1 illustrates a cross-sectional view of one part of the cabin K of a passenger aircraft without any limitation of the general applicability.

Inside cabin K seats 1 are provided, with a ventilation means 2 being associated with each seat 1, which comprises at least one nozzle in the embodiment illustrated here. The air is supplied via a duct 3, which is provided above the seats 1. Filters 4 are provided in the duct 3. In the zone of the seats 1 openings are provided through which the spent air is exhausted from the cabin K. Filters 4 may equally be provided in the seats and particularly in the backrest.

Figure 2:
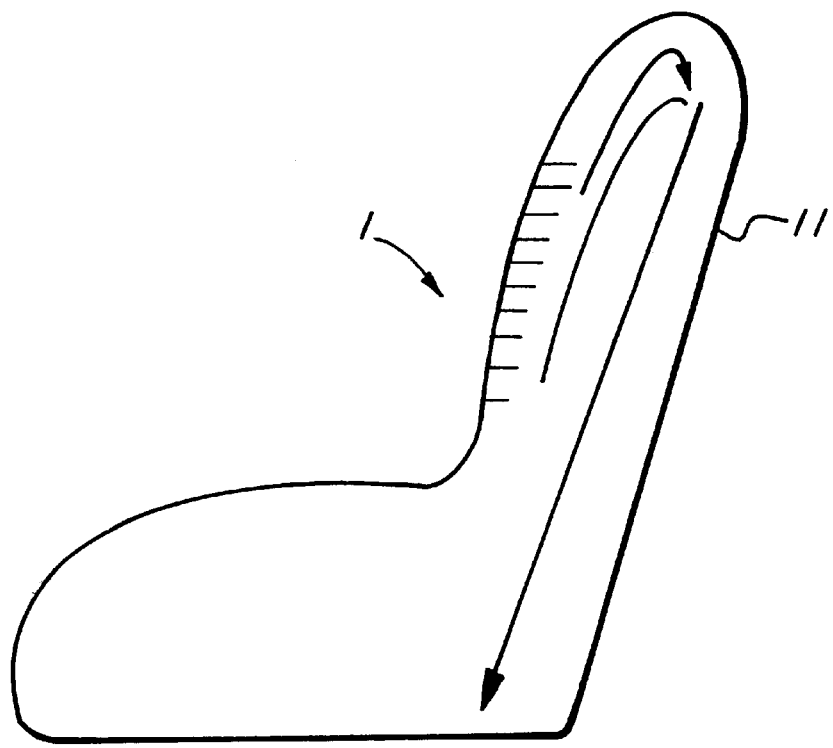
FIG. 2 shows a seat including an inventive air guiding system.

FIG. 2 shows a second embodiment of the invention in which at least one part of the air is exhausted from the cabin, which is not illustrated in more details here, via the seats and particularly via the backrest 11 of the seat 1 shown. The openings through which the air is exhausted are provided here in the backrest. With this provision possible sweating is efficiently counteracted. The air, which is exhausted via the backrests, may substantially serve as discharge air particularly when several ducts are provided for the air. Alternatively or additionally it is possible to pass the air exhausted via the backrest through the filter provided in the seat, and to have it discharged again via the rear side of the backrest.

It is particularly preferred that the air which is exhausted "passes along" the backrest so that the humidity created by sweating is absorbed by the exhausted air particularly efficiently.

In the embodiments illustrated in FIGS. 1 and 2 at least one additional CO sensor may be provided which produces an output signal that is applied to a controller not illustrated here, which controller serves to control the percentage of circulated air in the air flow introduced into the passenger cabin. In particular, the sensor is suitable to detect the $CO_2$ level in the air in the passenger cabin and/or in the supplied air flow.

Moreover, a humidity sensor may be provided in the discharged air, which produces an output signal applied to the controller for controlling the quantity of circulated air carried in the circulated air volume.

Figure 3:
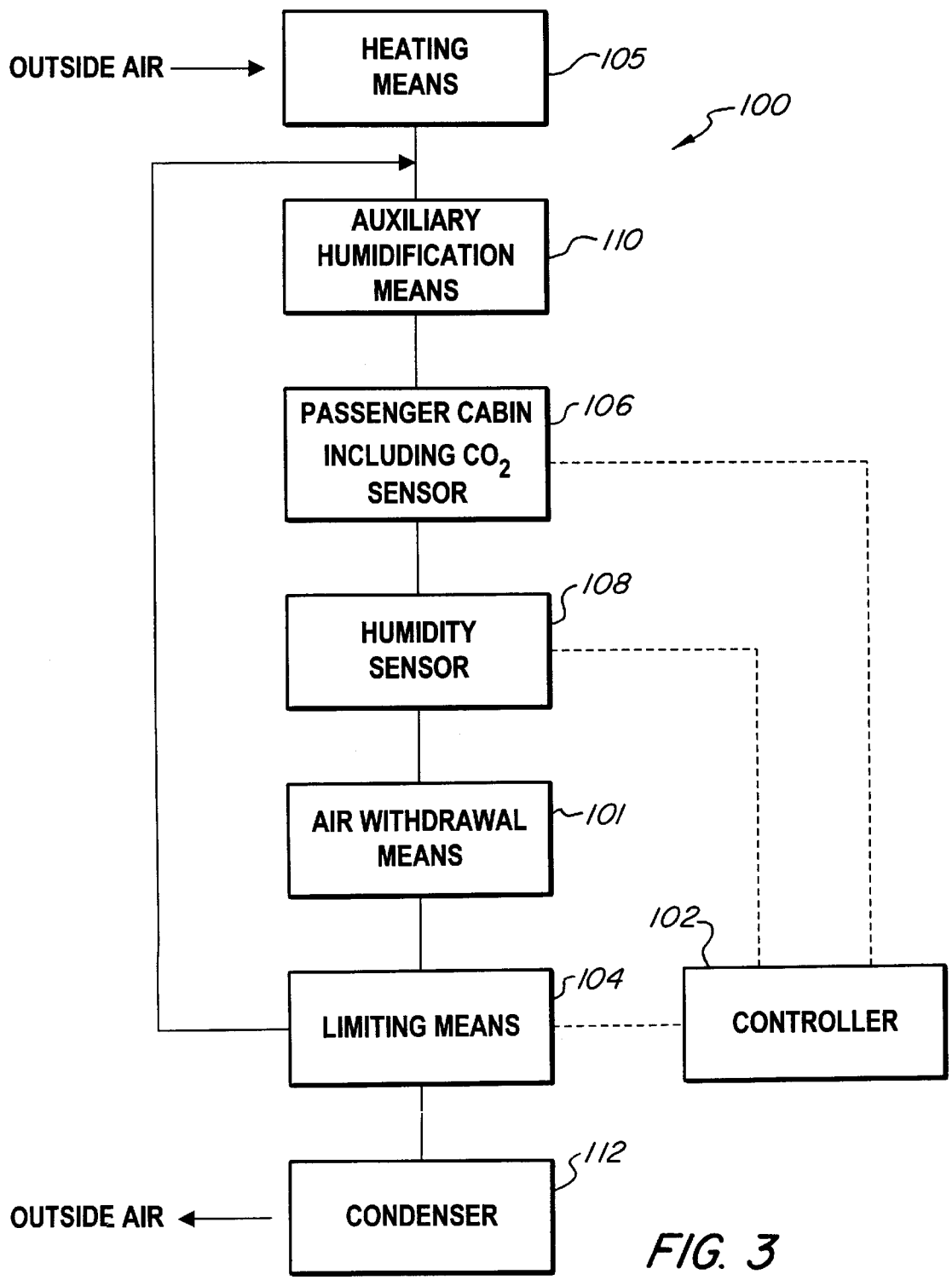
FIG. 3 is a schematic view of an air conditioning system of the present Invention.

FIG. 3 more clearly and schematically shows each of the previously described elements of an air conditioning system 100 of the present invention. Air is continuously withdrawn from a passenger cabin by an air withdrawal means 101. A controller 102 controls a limiting means 104 to limit a portion of the withdrawn air to be returned to the passenger cabin, and a remaining portion of the withdrawn air is discharged to the outside. Air from the outside is heated as necessary with a heater 105 and mixed with the air being returned to the passenger cabin. A $CO_2$ sensor 106 detects the content of $CO_2$ in the passenger cabin and a humidity sensor 108 detects the relative humidity of air in the passenger cabin, and output signals from both sensors are received by the controller 102. In the present invention the controller 102 controls the limiting means 104 to control also the humidity of air in the passenger cabin. Auxiliary humidification means 110 are operated only when the outside air is very dry. Moisture may be condensed using a condenser 112 from air discharged to the outside of the vehicle or aircraft and the condensed water used in the auxiliary humidification means 110.

What is claimed is:

1. A method of air conditioning a passenger cabin of a vehicle or an aircraft comprising the steps of:

continuously withdrawing air from said passenger cabin and discharging a portion of said air withdrawn from said passenger cabin to the outside of said vehicle or aircraft;

continuously mixing a remaining, not discharged portion of said air withdrawn from said passenger cabin with outside air to form replacement air containing a proportion of said air withdrawn from said passenger cabin;

continuously supplying said passenger cabin with said replacement air at a temperature just below that of air in said passenger cabin;

detecting a content of $CO_2$ of air in said passenger cabin and limiting the proportion of said air withdrawn from said passenger cabin in said replacement air, so that said content of $CO_2$ does not exceed a threshold value; and detecting a relative humidity of said air in said passenger cabin and adjusting the humidity of said replacement air before supplying said replacement air into said passenger cabin, so that the relative humidity of said air in said passenger cabin is maintained in a range of values which are greater than a relative humidity of said outside air would be at said temperature of the air in said passenger cabin, wherein said adjusting of the humidity of said replacement air is performed by further controlling the proportion of said air withdrawn from said passenger cabin in said replacement air whilst maintaining the content of $CO_2$ in said air in said passenger cabin below said threshold value.

2. A method according to claim 1, wherein said relative humidity of said air in said passenger cabin is maintained by humidifying said replacement air using water only when necessary.

3. A method according to claim 2, wherein water is condensed from air which is to be discharged from said vehicle or aircraft and used to humidify the replacement air.

4. A method according to claim 1, wherein the temperature of air in said cabin is maintained at about 23° C., and the relative humidity of air in said cabin is maintained at a level of at least about 20%.

5. A method according to claim 4, wherein the relative humidity of air in said cabin is maintained at a level of greater than 30%.

6. A method according to claim 1, wherein said threshold value of said content of $CO_2$ of air in said passenger cabin is about 0.15% by volume.

7. A method according to claim 1, wherein said threshold value of said content of $CO_2$ of air in said passenger cabin is about 0.10% by volume.

8. A method according to claim 1, wherein the replacement air is introduced into the passenger cabin via at least one filter.

9. A method according to claim 8, wherein said at least one filter is a large area filter having a low flow resistance, for removing odorous substances and aerosols from said replacement air.

10. A method according to claim 9, wherein said at least one filter is provided in a discharge opening through which said replacement air is supplied into said passenger cabin.

11. A method according to claim 9, wherein at least one part of the replacement air is supplied into said passenger cabin through discharge nozzles.

12. A method according to claim 8, wherein the replacement air is supplied into said passenger cabin through a cabin ceiling.

13. A method according to claim 12, wherein said at least one filter is provided in a cavity above the cabin ceiling.

14. A method according to claim 1, wherein the replacement air is supplied through a rear side of a passenger seat located in front of another passenger seat.

15. A method according to claim 14, wherein the replacement air is supplied through a filter provided in said passenger seat located in front of another passenger seat.

16. A method according to claim 15, wherein said filter is provided in the backrest of the passenger seat located in front of another passenger seat.

17. A method according to claim 1, wherein air is withdrawn from said passenger cabin through backrests of said passenger seats.

18. A method according to claim 17, wherein the air withdrawn through the backrests is substantially discharged to the outside of said vehicle or aircraft.

19. A method according to claim 17, wherein the air withdrawn through a backrest is passed through a filter provided in the associated seat and returned to said passenger cabin via the rear side of the backrest.

20. An air conditioning system for a passenger cabin of a vehicle or an aircraft, comprising:

means for continuously withdrawing air from said passenger cabin;

limiting means for limiting a portion of the air withdrawn from said passenger cabin to be returned to said passenger cabin;

means for discharging a remainder of the air withdrawn from said passenger cabin to the outside of said vehicle or aircraft;

means for continuously mixing the limited portion of the air withdrawn from said passenger cabin with outside air to form replacement air containing a proportion of air withdrawn from said passenger cabin;

means for heating said outside air to be mixed with said limited portion of air to a temperature just below that of air in said passenger cabin;

means for continuously supplying said passenger cabin with said replacement air;

at least one $CO_2$ sensor for detecting a content of $CO_2$ of air in said passenger cabin and producing an output signal;

a humidity sensor for detecting humidity of air in said passenger cabin and producing an output signal; and a controller for receiving said output signal of said at least one $CO_2$ sensor and said humidity sensor and controlling said limiting means so that said content of $CO_2$ does not exceed a threshold value, and adjusting the humidity of said replacement air so that a relative humidity of the air in said passenger cabin is maintained in a range of values which are greater than a relative humidity of said outside air would be at said temperature of the air in said passenger cabin, wherein said controller adjusts the humidity of said replacement air by further controlling the proportion of air withdrawn from said passenger cabin in said replacement air, whilst maintaining the content of $CO_2$ in the air in said passenger cabin below said threshold value.

21. An air conditioning system according to claim 20, further comprising means for humidifying said replacement air using water.

22. An air conditioning system according to claim 21, comprising means for obtaining said water by condensing moisture from air which is to be discharged from said vehicle or aircraft.

23. An air conditioning system according to claim 20, further comprising a $CO_2$ sensor for detecting a content of $CO_2$ in the replacement air and for producing an output signal which is received by said controller.

24. An air conditioning system according to claim 20, wherein said replacement air is supplied into said passenger cabin through a large-area filter having a low flow resistance.

25. An air conditioning system according to claim 24, wherein said filter is provided in a ceiling of said passenger cabin.

26. An air conditioning system according to claim 24, wherein said filter is provided in a backrest of a passenger seat located in front of another passenger seat.

27. An air conditioning system according to claim 24, wherein said filter removes odorous substances and aerosols.

28. An air conditioning system according to claim 24, wherein said filter is a micro filter or a composite filter.

29. An air conditioning system according to claim 24, wherein said filter is a micro filter coated with activated carbon, or a cartridge filled with activated carbon, or a micro filter with an additional zeolite filter.

30. An air conditioning system according to claim 24, wherein said filter is electrically biased.

31. An air conditioning system according to claim 24, wherein said filter comprises a non-woven fiber material.

32. An air conditioning system according to claim 20, wherein outside air is supplied into said cabin at a rate of at least about 0.5 $m^3$/min per passenger.

33. An air conditioning system according to claim 20, wherein the system is designed to exchange the air inside said passenger cabin at least 20 times per hour.

34. An air conditioning system according to claim 20, wherein means are provided for directing replacement air onto each passenger seat inside said passenger cabin, and for controlling a flow of said replacement air onto each passenger seat.

* * * * *